Nov. 24, 1925.

B. ICRE 1,562,702

VEHICLE BRAKE

Original Filed Feb. 8, 1917  2 Sheets-Sheet 1

WITNESS:
Charles A. Mathi.

INVENTOR
Baptiste Icre
by John Love
ATTORNEY

Nov. 24, 1925.
B. ICRE
VEHICLE BRAKE
Original Filed Feb. 8, 1917    2 Sheets-Sheet 2
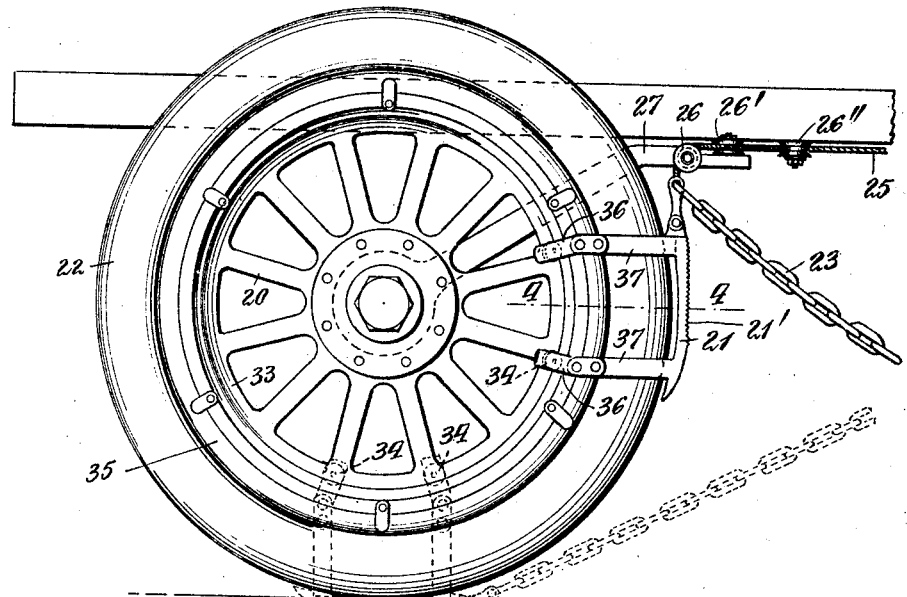
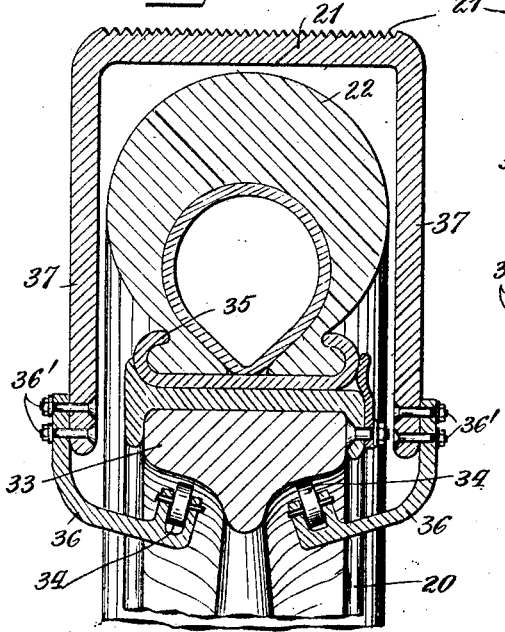
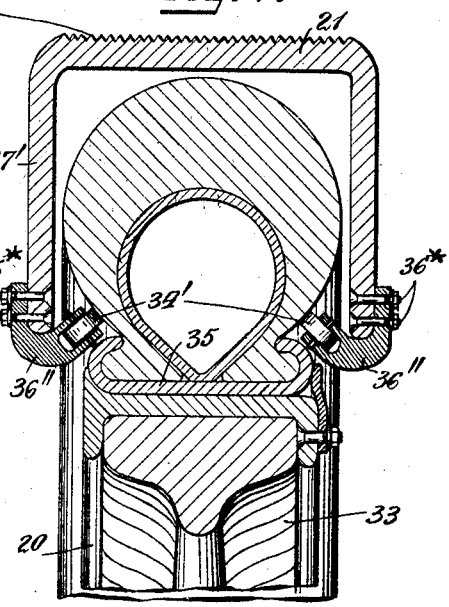
WITNESS:
Charles A. Mark
INVENTOR
Baptiste Icre
by John Lotka
ATTORNEY.

Patented Nov. 24, 1925.

1,562,702

UNITED STATES PATENT OFFICE.

BAPTISTE ICRE, OF NEW YORK, N. Y.

VEHICLE BRAKE.

Application filed February 8, 1917, Serial No. 147,293. Renewed February 9, 1925.

*To all whom it may concern:*

Be it known that I, BAPTISTE ICRE, a citizen of the French Republic, and resident of the borough of Manhattan, city, county, and State of New York, have invented certain new and useful Improvements in Vehicle Brakes, of which the following is a specification.

My present invention relates to brakes for vehicles and particularly for automobiles, and has for its object to provide a very efficient and quick-acting brake of the type in which a brake-shoe becomes interposed between the tread of a wheel and the surface on which said tread is running.

Preferably, my improved brake is constructed to be operated either automatically or when the chauffeur desires to apply it.

My invention may be carried out in many different ways, certain examples of which are shown in the accompanying drawings.

Figure 1:
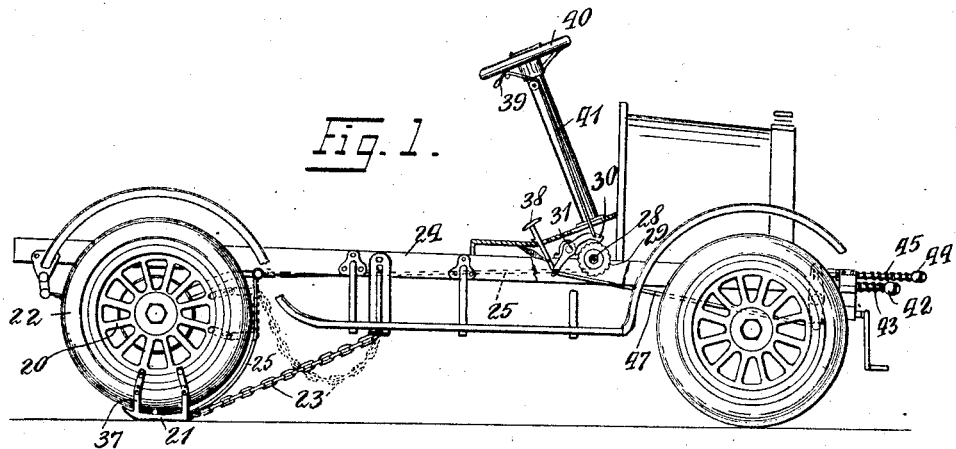
Figure 2:
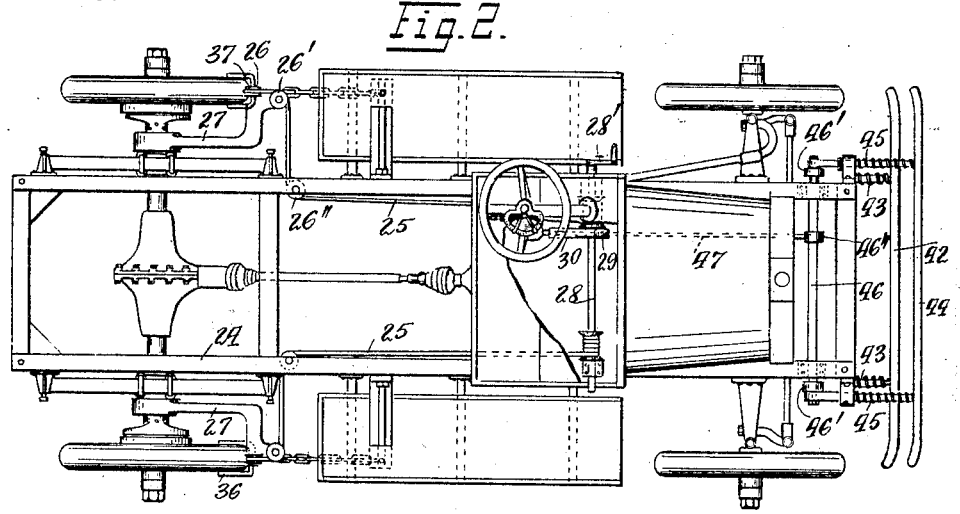
Figure 5:
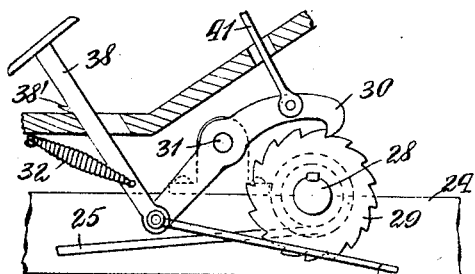
Figure 6:
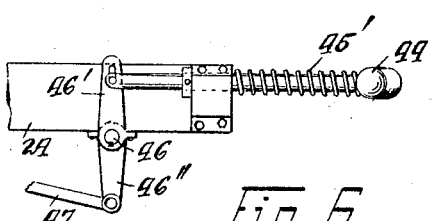

Fig. 1 is a side elevation of an automobile (the body being removed) with one form of my improved brake applied thereto, showing the brake in operation; Fig. 2 is a corresponding plan view; Fig. 3 is an enlarged view of the wheel and the brake shoe, the latter being raised to its normal inactive position; Fig. 4 is a horizontal cross section on the line 4—4 of Fig. 3; Fig. 5 is a detail longitudinal section showing chiefly the parts for locking the brake in its normal position and for releasing it; Fig. 6 is a partial side elevation showing a slightly different construction at the front of the automobile; and Fig. 7 is a view corresponding to Fig. 4, but showing a modified way of guiding the brake shoe on an automobile wheel.

As shown in Figs. 1, 2, and 3, the improved brakes are applied to the rear wheels 20 of an automobile. Each of these brakes consists of a shoe 21 adapted to become interposed, as in Fig. 1, between the tread surface of the tire 22 and the ground on which said tire is running, so as to cause the tire to be lifted from contact with the ground, upon the shoe 21 which in the operative position will slide on the ground. To increase the efficiency of the brake, the outer surface of the shoe may be corrugated or otherwise roughened, as indicated at 21'. To keep the shoe in its operative position when the brake is applied, I provide a chain or other flexible connection 23 the forward end of which is secured to the chassis 24 at a suitable point, its rear end being secured to the brake shoe. In the applied position of the brakes (Fig. 1), the two chains 23 are drawn tight, but when the brakes are raised off the ground to the normal position (see particularly Fig. 3), the chains 23 hang loose or slack.

Each of the brake shoes 21 is normally kept in its elevated, inactive position by means of a cable, wire or other flexible connection 25, extending in engagement with suitable guide-pulleys 26, 26', and 26" which are journaled on a stationary bracket 27 and on the chassis 24 respectively, and the forward ends of the two flexible connections 25 are coiled or wound on a transverse horizontal shaft 28 journaled in the chassis. By turning this shaft, say by means of the crank 28' located at one end thereof, both shoes 21 may be raised at the same time to the normal position which Fig. 3 shows in full lines. In order to retain the brake shoes in this inactive position, a ratchet wheel 29, secured rigidly to the shaft 28, may be normally held against turning, by means of a pawl 30 fulcrumed at 31 (Fig. 5) and normally held against said ratchet by the action of a spring 32 hereinafter referred to.

In passing from its inactive to its operative position, the brake shoe 21 is guided along the adjacent rear wheel 20. For this purpose, as shown particularly in Fig. 4, the shoe is provided with portions adapted to engage wheel surfaces facing toward the center or axis of the wheel. As shown in Figs. 1, 3, and 4, these engaged or track-forming surfaces are the inner surfaces of the felly 33, and preferably the shoe is provided with rollers 34 adapted to travel on said surfaces. In order that the brake shoe may be separated from the wheel, say for the purpose of removing a tire, or the demountable rim 35 with the tire, the rollers 34 are journaled on inwardly-extending members or brackets 36 secured detachably (at 36') to preferably parallel arms 37 extending from the ends of the shoe 21, on both sides of the tire 22, toward the axis of the wheel. When the brake shoe 21 is suspended in the raised normal position, the rollers 34 serve simply to reduce friction where they are engaged by the rotating wheel felly 33. If the shoe 21 is released in the manner to be set forth presently, the weight of the brake-shoe, together with the tendency of the rotating wheel to carry the rollers and the brake shoe along in the direction of rotation, will cause the said shoe to be guided and carried to the operative position (Fig. 1). As the brake shoe is located in advance of the wheel, at about the level of its center, it follows that with a wheel circumference of about ten feet, the distance which the shoe will have to travel along the circumference in order to come in contact with the ground, will be about 2½ feet (one-fourth of the circumference). The brake will therefore become operative very quickly, after the motor car has traveled only about 2½ feet from the moment the brake shoe began to drop, and the forcible engagement of the brake shoe with the ground will stop the automobile in a relatively short time and distance. With present brake constructions, a person struck by an automobile is generally thrown forward a certain distance by the blow, but the brakes cannot bring the machine to a stop in time to save the knocked down person from being run over. My new brake however is of such powerful and quick action that the car will be stopped before even the front wheels can run over the person which has been thrown to the ground by collision with the car. It will be observed that the arms 27 and end members 36 together with the brake shoe 21, fully embrace the tire 22 with its rim 35 and the felly 33, thus keeping the brake shoe securely positioned relatively to the tire and particularly preventing any lateral movement of sufficient extent to bring the brake shoe out of operative relation to the tire. The provision of rollers 34 at both ends and at both sides of the brake shoe also materially strengthens the structure and makes it practically impossible for these parts to break or to take a wrong position.

For the purpose of releasing the shaft 28 and allowing the brake shoes 21 to drop to their operative position, the pawl 30 is removed from engagement with the ratchet wheel 29. Three separate devices for accomplishing this result are provided, in the particular construction shown in Figs. 1 to 6: First, the pawl may be swung off the ratchet by depressing a pedal 38 connected pivotally with the pawl lever on the side of the fulcrum 31 opposite to the pawl proper. Second, this pawl may be lifted by pulling on a suitable handle 39, preferably placed on the steering wheel 40, and connected with the pawl 30 by a wire or other flexible connection 41. These two methods of releasing the shaft 28 and causing the brake shoes 21 to become operative, are controlled by the chauffeur. The third device is automatic, and is preferably connected with, and operated by, a bumper or like device located at the front of the automobile. According to Figs. 1 and 2, I provide, in addition to the ordinary safety bumper 42 having very strong springs 43, an auxiliary bumper 44 located slightly in advance of the main bumper and pressed forward by springs 45 which are not so strong as the springs 43. When the auxiliary bumper 44 slides back upon striking a person or an article, the force of the shock is somewhat broken, and at the same time the bumper, the rearward extensions of which engage slotted crank arms 46' on a transverse shaft 46, rocks said shaft in such a manner that another crank arm 46'' on it will, by means of a wire or other flexible connection 47, throw the pawl 30 off the ratchet 29 and cause the operation of the brakes as above set forth.

The successive action of the two bumpers 44 and 42, graded as to their resiliency, will prevent injury with greater certainty than when a single bumper, with a relatively stiff spring, is employed. Still, in some cases a single bumper, with springs 45' of appropriate strength, may be sufficient, as indicated in Fig. 6. This construction differs from the one shown in Figs. 1 and 2, simply by the omission of the bumper 42 and its springs 43, and generally also by the use of springs 45' stronger than the springs 45.

The main bumper 42, in Figs. 1 and 2, has no operative connection with the brake mechanism, the latter being controlled by the auxiliary bumper 44. The automatic application of the brake formed by the shoes 21 is very quick, as the auxiliary bumper 44 releases the shaft 28 almost instantaneously.

When the spring 32 is located as shown in Fig. 5, it will perform not only the function of normally engaging the pawl 30 with the ratchet 29, but also of pulling the pedal 38 upward and rearward, tending to restore it to the normal position shown. The pedal may be formed with a projection or hook 38' adapted to catch under the floor of the car, or under any other suitable part, whenever the pedal 38 is depressed, either by a downward push on it, or by a pull on either of the flexible connections 41 or 47. This will hold the pawl 30 in the off position when it is swung away from the ratchet 29. In this manner, I prevent premature dropping back of the pawl into engagement with the ratchet, which premature re-engagement would result in arresting the brake shoes 21 before they had reached their operative position. To re-establish the normal position of the pawl, the pedal 38 would be pushed forward to disengage its hook 38' and allow the spring 32 to restore both the pedal and the pawl to their normal positions.

While it is obvious that the automobile will generally be provided with the usual brakes for ordinary conditions, the improved brake will form a very powerful emergency brake, and its automatic operation, through its connection with the bumper, will serve to mitigate the severity of accidents. An important feature of my invention lies in the fact that after the brake has been dropped to its operative position, it cannot be brought back to its normal position, or released, except as follows: First, the car must be brought to a stop and then backed until the rear wheels move off the brake shoes 21; second, the car must be stopped again and the chauffeur must alight in order to turn the crank 28' and raise the brake shoes off the ground to the normal, inactive position. This manipulation takes sufficient time to enable a policeman or any other witness of an accident to reach the chauffeur or at least note the number of the automobile; and it will be impossible for the chauffeur, after a collision, to immediately put on speed and escape without even leaving an identifying clue. The policeman can also by a simple test ascertain whether the automatic brake is working properly; for this purpose, he will strike a blow rearwardly on the bumper, and failure of the brake to then operate will indicate that it has been tampered with or is otherwise out of order.

In Fig. 7, the rollers 34' are carried by end members 36'' secured detachably at 36* to arms or brackets 37' somewhat shorter than the arms 37 of Fig. 4, so that the rollers, instead of engaging the felly 33, run on the tire 22 at the inner surface thereof, that is to say, the surface which faces toward the axis of the wheel. In any event, the inwardly-facing surface, whether of the tire or of the felly, on which the rollers run, prevents or rather limits the movement of the brake shoe 21 away from the wheel's axis. Of course, some play is allowed in this direction, since otherwise the tire would rub hard against the shoe when the latter is in its normal position.

The brake shoes 21 are shown, as located forward of the axes of the respective wheels, and will thus be operative to arrest forward travel only. It will be obvious that by placing the brake shoes on the opposite side (to the rear of a wheel's axis) they will become operative to arrest the rearward movement of the vehicle. Where it is desired to stop both rearward and forward travel, both arrangements of the brake shoes would be employed, that is to say, there would be a brake shoe for stopping forward travel, and another brake shoe for stopping rearward travel.

Various modifications may be made without departing from the nature of my invention as set forth in the appended claims.

I claim as my invention:

1. In a wheeled vehicle, a vehicle wheel provided with an internal circular circumferential track rigidly secured to said wheel and facing the center of the wheel, means interposed between said track and the wheel center, said means engaging said track and adapted to travel along the same about the axis of the wheel, a brake shoe adapted to become interposed between the tread of the wheel and the surface on which said tread runs, a connection extending outwardly from said track-engaging means to said brake-shoe to compel the latter to swing about the axis of the wheel, and means for controlling the position of said brake-shoe.

2. In a wheeled vehicle, a wheel provided with a circumferential track, a brake shoe mounted to swing about the axis of the wheel and provided with guiding means located between said track and the center of the wheel and arranged to travel in engagement with the concave face of said track along an arc centered upon the axis of the wheel, means, connected with said shoe, for limiting its circumferential movement in the direction in which it travels to its operative position, means, likewise connected with the shoe, for moving it circumferentially of the wheel in the opposite direction, to the inactive position, means for locking the brake shoe in its inactive position, and means for releasing the shoe from such inactive position.

3. In a wheeled vehicle, a wheel having a concave circumferential track of circular shape concentric with the axis of the wheel, a brake shoe provided with guiding means in engagement with said concave circular track, a rotary drum, a flexible connection secured to said shoe and winding on said drum, means for normally holding said drum against rotation, and means for releasing the drum.

4. In a wheeled vehicle, two transversely aligning wheels each having a circular concave circumferential track, brake shoes movable circumferentially of said wheel and provided with guiding means arranged to travel along the concave circular tracks of the respective wheels in arcs centered upon the axes of said wheels, a transverse shaft, flexible connections each of which has one end secured to one of said shoes and the other end coiled on said shaft, means for normally preventing rotation of said shaft, and means for releasing the shaft to cause the brakes to be applied.

In testimony whereof I have signed this specification.

BAPTISTE ICRE.